US012071776B2

(12) United States Patent
Pippins

(10) Patent No.: US 12,071,776 B2
(45) Date of Patent: Aug. 27, 2024

(54) ROOF ACCESS SYSTEM

(71) Applicant: Nickolas Pippins, Neptune Beach, FL (US)

(72) Inventor: Nickolas Pippins, Neptune Beach, FL (US)

( * ) Notice: Subject to any disclaimer, the term of this patent is extended or adjusted under 35 U.S.C. 154(b) by 245 days.

(21) Appl. No.: 17/848,834

(22) Filed: Jun. 24, 2022

(65) Prior Publication Data

US 2022/0316225 A1 Oct. 6, 2022

(51) Int. Cl.
*E04G 21/32* (2006.01)
*A62B 35/00* (2006.01)

(52) U.S. Cl.
CPC ...... *E04G 21/3214* (2013.01); *A62B 35/0068* (2013.01); *E04G 21/328* (2013.01)

(58) Field of Classification Search
CPC .............. E04G 21/3214; E04G 21/328; E04G 21/3276; A62B 35/0068
See application file for complete search history.

(56) References Cited

U.S. PATENT DOCUMENTS

| | | | | |
|---|---|---|---|---|
| 4,398,620 | A * | 8/1983 | Townsend | E04G 3/265 182/17 |
| 4,607,724 | A | 8/1986 | Hillberg | |
| 5,137,112 | A | 8/1992 | Nichols | |
| 5,287,944 | A | 2/1994 | Woodyard | |
| 5,730,246 | A | 3/1998 | Beard | |
| 5,758,743 | A | 6/1998 | Coyle et al. | |
| 5,875,867 | A | 3/1999 | Beard | |
| 6,668,509 | B1 | 12/2003 | Krebs | |
| 8,292,030 | B2 | 10/2012 | Ballantyne | |
| 9,248,323 | B1 * | 2/2016 | Larsen | A62B 35/0068 |
| 9,670,685 | B2 | 6/2017 | Landry | |
| 10,744,353 | B2 | 8/2020 | Ballantyne | |
| 2007/0007503 | A1 * | 1/2007 | Martinez | E04G 5/041 256/59 |
| 2011/0314763 | A1 | 12/2011 | Gandellini | |
| 2012/0312633 | A1 | 12/2012 | Massey | |
| 2014/0251724 | A1 | 9/2014 | Nichols, Jr. | |
| 2014/0339016 | A1 | 11/2014 | Hopkins et al. | |
| 2020/0047008 | A1 | 2/2020 | Falgares et al. | |
| 2020/0277801 | A1 | 9/2020 | Ballantyne | |
| 2022/0341199 | A1 * | 10/2022 | Grant | E04G 21/328 |

FOREIGN PATENT DOCUMENTS

| | | | |
|---|---|---|---|
| CA | 2916472 | A1 | 7/2016 |
| GB | 2334292 | A | 8/1999 |
| WO | 2013125945 | A1 | 8/2013 |

* cited by examiner

*Primary Examiner* — Mark R Wendell
(74) *Attorney, Agent, or Firm* — Lippes Mathias LLP; Mitchell Ghaneie

(57) ABSTRACT

The present disclosure provides two exemplary, non-limiting embodiments of a roof access system comprising a roof anchor assembly for providing one or more users thereof with supplemental stabilization while traversing a sloped rooftop. The roof anchor assembly comprises two or more eave anchors, a ridge plate, and two or more safety lines. The roof anchor assembly is designed to be used on structures comprising roofs which further comprise a ridge and two or more eaves. The two or more eave anchors are installed at eaves on opposing sides of the structure and the ridge plate is placed at the ridge in between the two eave anchors. Each eave anchor is designed to be engaged when the user is traversing the sloped rooftop on the opposing side of the ridge relative to the side that the eave anchor is installed.

20 Claims, 6 Drawing Sheets

ROOF ACCESS SYSTEM

FIELD OF THE INVENTION

This invention relates generally to a roof access system for improving stability of one or more individuals accessing a sloped rooftop.

BACKGROUND

Accessing rooftops of residential or commercial structures can be a hazardous endeavor. A variety of fall restraint systems have been utilized to improve worker safety during active construction on rooftops. However, such fall restraint systems are often difficult to install, heavy, and cost prohibitive. In addition to construction related activities, access to rooftops is also needed from time to time to perform visual inspections and routine maintenance. Such access is often only needed for limited durations and not always regulated as stringently as prolonged construction activities on rooftops. Furthermore, many conventional fall restraint systems consist of anchors which require penetrations to be made through the roofing in order to be properly installed. Consequently, many inspectors, adjusters, and other individuals simply accessing the rooftop to visually observe existing roof conditions often opt out of utilizing conventional fall restraint systems. While the risk of injury during relatively short-term durations on rooftops is reduced, it is not eliminated and, unfortunately, such injuries are still a common occurrence.

Accordingly, a roof anchor assembly which is easy to transport, simple to install and nondestructive is disclosed herein.

SUMMARY OF THE INVENTION

The present disclosure provides an exemplary, non-limiting embodiment of a roof access system comprising a roof anchor assembly for providing one or more users thereof with supplemental stabilization while traversing a sloped rooftop. The roof anchor assembly includes two or more eave anchors, a ridge plate, and two or more safety lines. The roof anchor assembly is configured to be nondestructive, quick to install and compatible with a variety of types of roofs which have a ridge and eaves with overhangs.

The two or more eave anchors include a first eave anchor and a second eave anchor. The first and second eave anchors are installed on opposing sides of the ridge. The two or more safety lines include a first safety line and a second safety line. Each safety line of the two or more safety lines each comprising an anchor end and a working end. The anchor end of the first and second safety lines are detachably coupled to the first and second eave anchors, respectively.

Each eave anchor further comprises a pair of stability hooks as well as two prongs. Each prong comprises a distal end. The pair of stability hooks assist in suspending the eave anchor from the eave, or a gutter spanning along the eave, prior to the eave anchor being fully engaged by a safety line. When the safety line is pulled taut it engages the eave anchor such that the distal ends of the two prongs engage the soffit of the eave to resist the load imparted by the safety line.

The ridge plate comprises two pairs of open cross-section guides, a top plate, and a bottom plate. The ridge plate is installed over the ridge of the roof. Each of the open cross-section guides are affixed to the top plate and are oriented such that its position with respect to the other open cross-section guide of its pair forms a central opening. Upon disposing the safety line through the central opening of a pair of open cross-section guides, the segment of the safety line spanning between the anchor end and the ridge plate is substantially restrained from translating laterally relative to the ridge plate.

NUMBER REFERENCES

1—Structure
2—Roof
3—First Side
4—Second Side
5—Roof Anchor Assembly
10—Sloped Rooftop
11—Gutter
12—Ridge
13—Eave
13A—First Eave
13B—Second Eave
14—Soffit
30—Safety Line
30A—First Safety Line
30B—Second Safety Line
31—Supplemental Stability Accessory
40—Ridge Plate
41—Pair of Open Cross-Section Guides
42—Top Plate
43—Bottom Plate

44—Central Opening
50—User
50A—First User
50B—Second User
120—Eave Anchor
120A—First Eave Anchor
120B—Second Eave Anchor
121—Pair of Stability Hooks
122—Bearing Cap
124—Prong
125—First End
126—Second End
220—Eave Anchor
222—Bearing Pad
224—Extendable Prong
225—Locking Pin

DETAILED DESCRIPTION

In the following description, reference is made to the accompanying drawings which form a part hereof and which illustrate two embodiments of the present invention. It is understood that other embodiments may be utilized, and structural and operational changes may be made without departing from the scope of the present invention.

Figure 1:
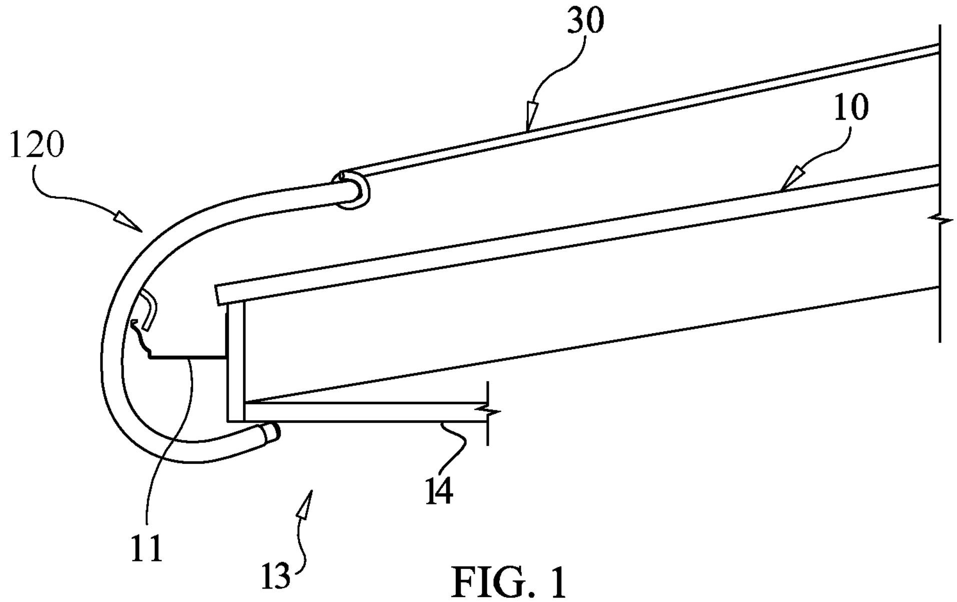
FIG. 1 depicts an in-use view of a first exemplary, non-limiting embodiment of an eave anchor of a roof access system configured about an eave and connected to a safety line.
Figure 7:
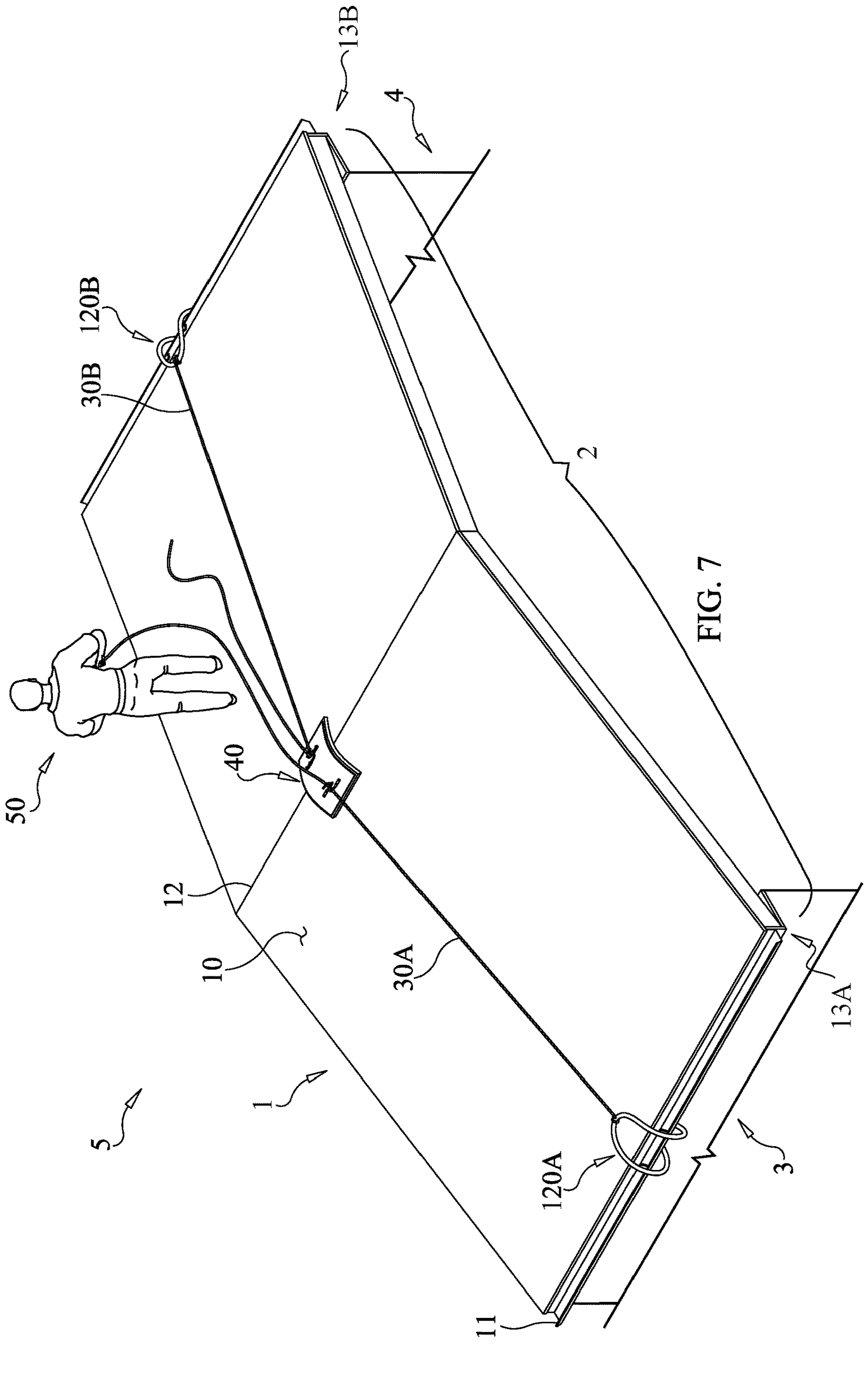
FIG. 7 depicts an in-use view of an exemplary user of the roof access system standing on a roof of a structure while holding a first safety line which is attached to a first eave anchor.
Figure 8:
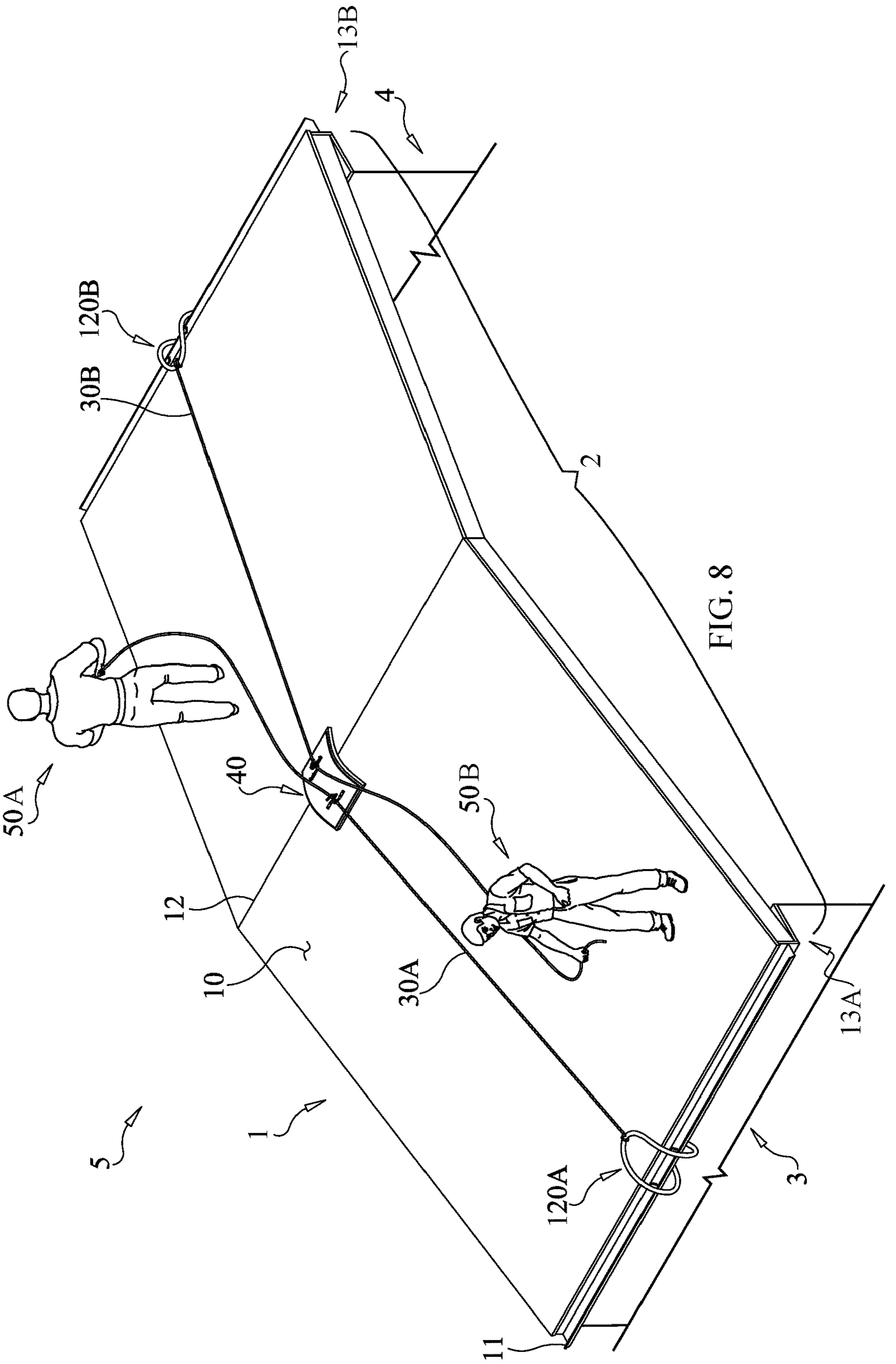
FIG. 8 depicts an in-use view of two exemplary users of the roof access system accessing the roof, wherein the user standing closer to the first side is holding a second safety line that is connected to a second eave anchor and the user standing closer to the second side is holding the first safety line connected to the first eave anchor.
Figure 9:
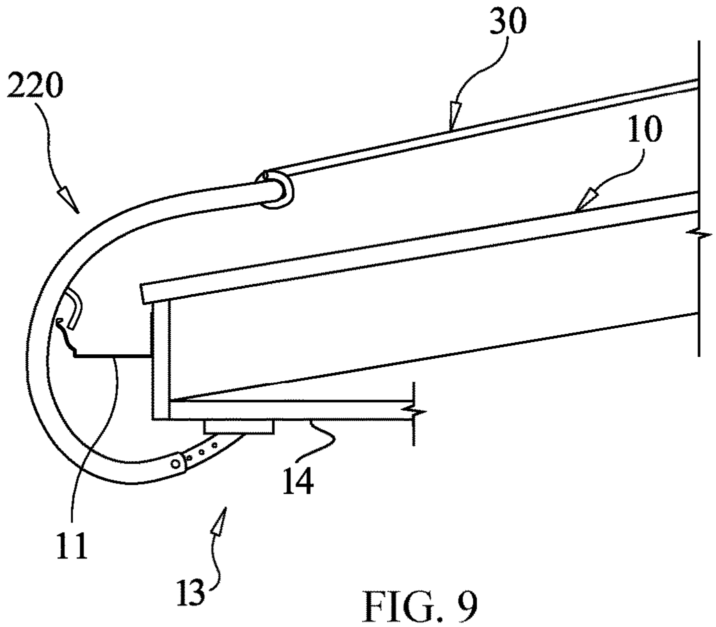
FIG. 9 depicts an in-use view of a second exemplary, non-limiting embodiment of the eave anchor of the roof access system configured about the eave and connected to the safety line.
Figure 10:
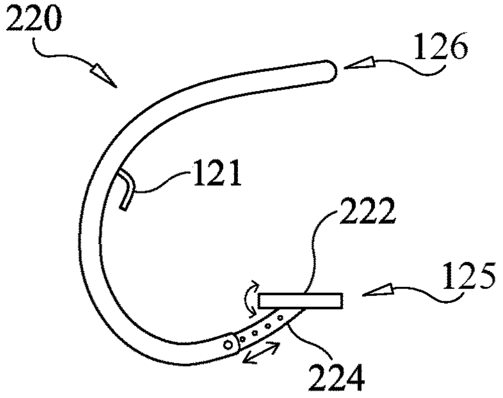
FIG. 10 depicts a side view of the second exemplary, non-limiting embodiment of the eave anchor.

A roof access system includes a roof anchor assembly 5 and a structure 1, such as an open structure, such as, but not limited to a pavilion, a stable or the like, or a building, such as, but not limited to, a house, a warehouse, a barn, a church, etc. The structure 1 comprises a roof 2, a first side 3, and a second side 4. The roof 2 includes a sloped rooftop 10, a ridge 12 as well as two or more eaves 13. Each eave 13 includes an overhang, a gutter 11, and a soffit 14, as shown in FIGS. 1 and 9. The first and second sides 3, 4 are located on opposing sides of the structure 1, as shown in FIGS. 7 and 8. The two or more eaves 13 comprise a first eave 13A and a second eave 13B. As shown in FIGS. 7 and 8, the first eave 13A is attached to the first side 3 and the second eave 13B is attached to the second side 4. The roof anchor assembly 5 provides supplemental stability for one or more users 50 traversing the sloped rooftop 10.

First Embodiment

In a first exemplary, non-limiting embodiment of the roof access system, the roof anchor assembly 5 includes two or more eave anchors 120, a ridge plate 40, and two or more safety lines 30. The two or more eave anchors include a first eave anchor 120A and a second eave anchor 120B. As shown in FIGS. 7 and 8, the first and second eave anchors 120A, 120B are located at the first and second eaves 13A, 13B, respectively.

Figure 2:
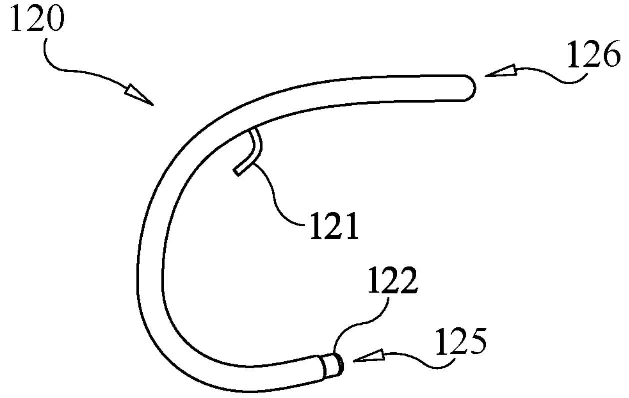
FIG. 2 depicts a side view of the first exemplary, non-limiting embodiment of the eave anchor.
Figure 3:
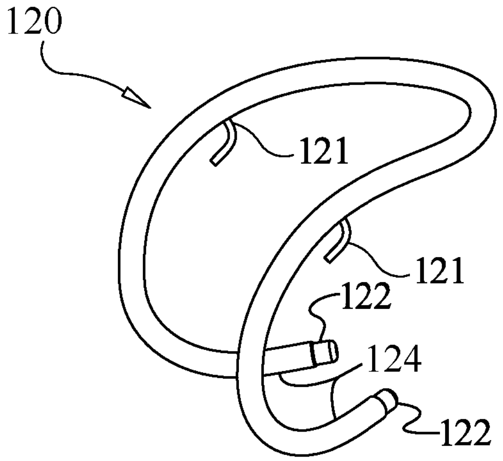
FIG. 3 depicts a perspective view of the first exemplary, non-limiting embodiment of the eave anchor.
Figure 4:
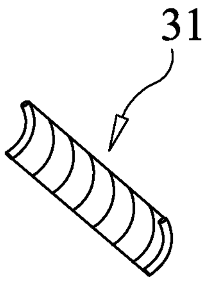
FIG. 4 depicts a perspective view of the supplemental stability accessory.

Each eave anchor 120 comprises a folded hairpin shape, as shown in FIG. 3, as well as a first end 125 and a second end 126, as shown in FIG. 2. The folded hairpin shape of the eave anchor 120 provides an efficient structural configuration for transferring loads imparted by the safety line 30, which is detachably coupled to the eave anchor substantially near its second end 126, to the soffit 14 without substantially deforming the eave anchor 120. Each eave anchor 120 further includes an integral tortuous body, two prongs 124, and two bearing caps 122. Preferably each of the two or more safety lines 30 comprises a static rope. However, it is anticipated that other types of ropes or cables could be used as safety lines 30.

Each of the two prongs 124 are preferably integrally attached to the body of the eave anchor 120. However, it is anticipated that the prongs 124 could be unitarily constructed and detachably coupled to the body of the eave anchor 120. The body of the eave anchor and the prongs 124 are constructed of a rigid material with a high strength to weight ratio, such as a metal alloy or fiberglass composite. Each prong 124 comprises a distal end. Each bearing cap 122 is detachably coupled to the distal end of a distinct prong 124. The bearing caps 122 are utilized to improve the transfer of one or more forces from the eave anchor 120 to the soffit 14 when the eave anchor 120 is loaded by the safety line 30 that it is attached to.

The bearing caps 122 are preferably constructed of a compressible material. The bearing caps 122 assist with mitigating damage to the soffit 14 and may further assist in dampening impact loading resulting from sudden tensioning of the safety line 30 that it is attached to. It is anticipated that the body of the eave anchor, as well as the prongs 124, may be encased by an outer layer of material, such a coating or self-adhesive tape, to protect the material of which the body of the eave anchor and the prongs are constructed.

Figure 12:
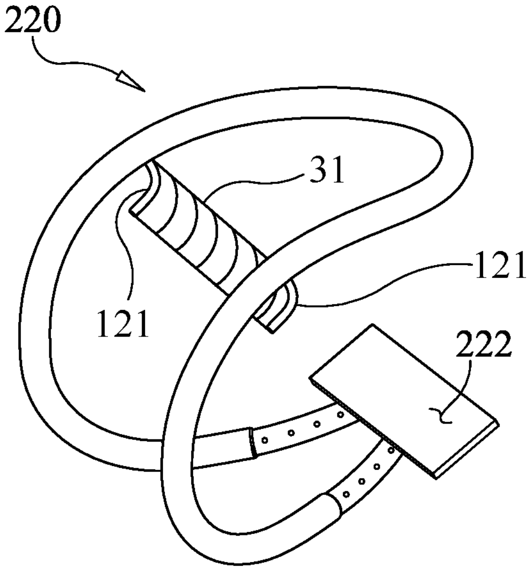
FIG. 12 depicts a perspective view of the second exemplary, non-limiting embodiment of the eave anchor with a supplemental stability accessory attached to a pair of stability hooks.

Additionally, each eave anchor 120A, 120B further includes a pair of stability hooks 121. The pair of stability hooks 121 assist with stabilization of the eave anchor 120 during installation of the roof anchor assembly 5 as well as during times when the eave anchor 120 is not loaded. The pair of stability hooks 121 allow the eave anchor 120 to be suspended from the edge of the eave 13, or from the lip of the gutter 11 that spans along the respective eave 13 of which the eave anchor is located. As shown in FIG. 12, it is anticipated that a supplemental stability accessory 31 could be attached to the pair of stability hooks 121 to further assist with suspending the eave anchor prior to the eave anchor 120 being loaded by the safety line 30 which it is attached to. Upon being loaded by the safety line 30, the eave anchor 120 engages the soffit 14 to transfer the forces into the structure 1.

The two or more safety lines 30 include a first safety line 30A and a second safety line 30B. Each safety line 30 comprises an anchor end and a working end. Preferably, each safety line 30 is detachably coupled to a distinct eave anchor 120 near its respective anchor end. As shown in FIG. 7, the first safety line 30A is detachably coupled to the first eave anchor 120A substantially at the second end 126 of the first eave anchor 120A and the second safety line 30B is detachably coupled to the second eave anchor 120B substantially near the second end 126 of the second eave anchor 120B. It is anticipated that a safety line 30 could be configured to be attached to the eave anchor 120 at an alternative location between its anchor end and working end (not shown).

Figure 5:
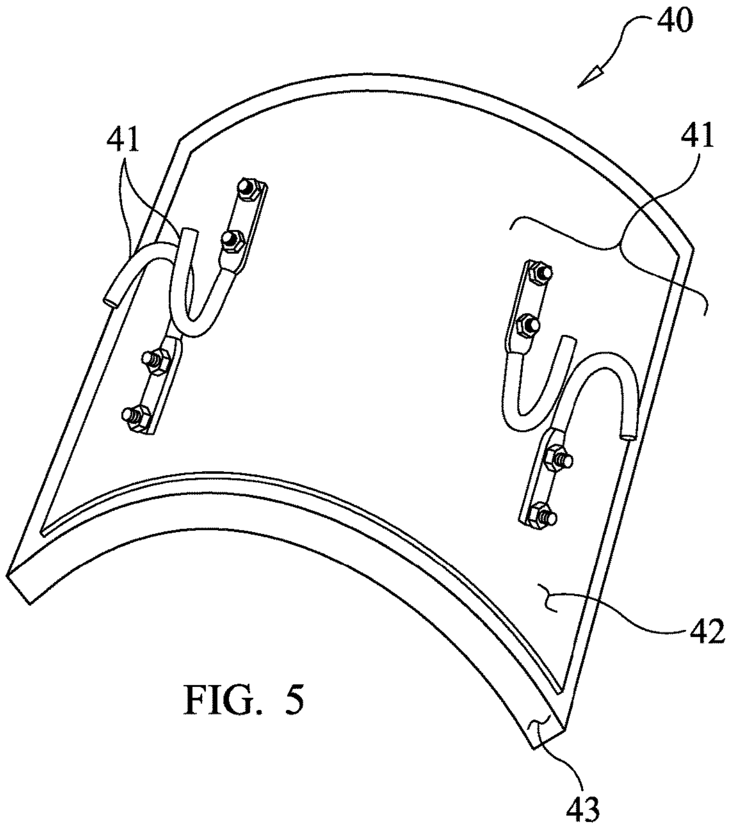
FIG. 5 depicts a perspective view of an exemplary, non-limiting embodiment of a ridge plate.
Figure 6:
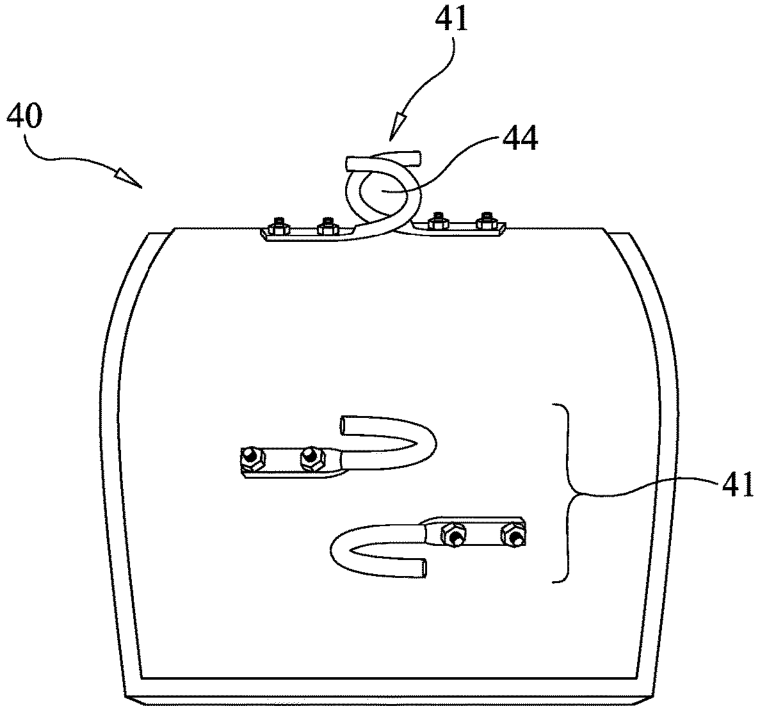
FIG. 6 depicts a side view of the exemplary, non-limiting embodiment of the ridge plate.

As shown in FIG. 5, the ridge plate 40 includes two pairs of open cross-section guides 41, a top plate 42, and a bottom plate 43. The top and bottom plates 42, 43 are affixed to one another. As shown in FIGS. 7 and 8, the ridge plate 40 is positioned over a portion of the ridge 12. Preferably the first eave anchor 120A, second eave anchor 120B, and ridge plate 40 are aligned with one another such that they are substantially coplanar, as shown in FIGS. 7 and 8. Each open cross-section guide of the two pairs of open cross-section guides 41 is attached to the top plate 42 such that its position with respect to the other open cross-section guide of its pair forms a central opening 44, as shown in FIG. 6. Upon disposing the safety line 30 through the central opening 44, the segment of the safety line spanning between the eave anchor 120 and the ridge plate 40 is substantially restrained from translating laterally relative to the ridge plate 40, as shown in FIG. 8. The substantial lateral restraint of the segment of the safety line 30 spanning between the ridge plate 40 and the eave anchor 120 which it is attached to, prevents the safety line from directly contacting the ridge 12 while the safety line is under tension and, accordingly, prevents the safety line from damaging the ridge 12. It is anticipated that each pair of the two pairs of open cross-section guides 41 may be accompanied by a third open-cross section guide, wherein the third open cross-section guide is attached to the top plate 42 and oriented in an opposing direction relative to the open cross-section guide of the pair of open cross-section guides 41 which it is most closely positioned to (not shown). It is further anticipated that a closed section guide, such as an eye bolt or the like, could alternatively be used in place of the pair of open cross-section guides 41.

Second Embodiment

Figure 11:
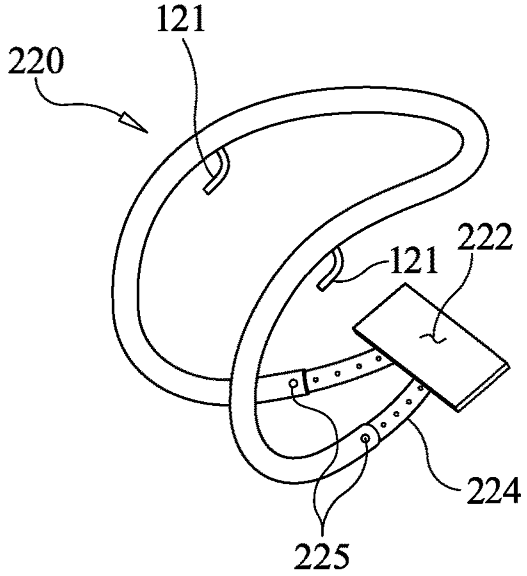
FIG. 11 depicts a perspective view of the second exemplary, non-limiting embodiment of the eave anchor.

A second exemplary, non-limiting embodiment of a roof access system includes a roof anchor assembly 5 with the same properties, characteristics, and features with respect to the first exemplary, non-limiting embodiment of the roof anchor assembly with the exception of each eave anchor 220 comprising two extendable prongs 224 (in place of the two prongs 124) and a unitary bearing pad 222 (in place of the two bearing caps 122) that is attached to the distal ends of the two extendable prongs 224. The bearing pad 222 is preferably constructed of a compressible material. The two extendable prongs 224 are telescopically configurable such that each may be extended outward at predetermined intervals to reduce the distance between the bearing pad 222 and the soffit 14 when the eave anchor 220 is not loaded by the safety line 30. Each eave anchor 220 further comprises two locking pins 225, each proximately located near the respective distal end of the two extendable prongs 224, as shown in FIG. 11. The two extendable prongs 224 are each secured in place and prevented from substantially extending or retracting by the locking pins 225, as shown in FIG. 11. Each of the locking pins 225 can be configured to an unlocked position to allow the two extendable prongs 224 to extend outward or inward at predetermined intervals.

The bearing pad 222 includes a top and bottom surface. It is anticipated that the bearing pad 222 may be pivotably configurable such that it may pivot about its longitudinal axis and to be oriented such that its top surface is configured in a substantially parallel plane relative to soffit 14, as shown in FIG. 9.

METHOD OF USE

A method of using the roof anchor assembly 5 which includes attaching the first safety line 30A to the first eave anchor 120A/220A; accessing the first eave 13A of the roof 2 located on the first side 3 of the structure 1; hanging the first eave anchor 120A/220A from a gutter 11 spanning along the first eave 13A; configuring a working end of the first safety line 30A to be proximate to a second side 4 of the structure 1 such that the first safety line 30A crosses over a portion of a ridge 12 of the roof 10; attaching a second safety line 30B to a second eave anchor 120B; accessing the second eave 13B; hanging the second eave anchor 120B/220B from a gutter 11 spanning along the second eave 13B; accessing the first safety line 30A and the ridge plate 40; configuring the ridge plate 40 to be located over a portion of the ridge 12; configuring the first safety line 30A through the central opening 44 of one of the pairs of open cross-section guides 41 and the second safety line 30B through the central opening 44 of the other pair of open cross-section guides 41; and maintaining possession of the safety line 30 that is attached to the eave anchor 120 located on the opposing side of the ridge 12 which is being traversed (as shown in FIG. 8).

While the foregoing exemplary non-limiting embodiments of the roof access system have been disclosed herein, certain modifications may be made by those skilled in the art to modify the embodiments without departing from the spirit of the invention.

What is claimed:

1. A roof access system comprising:
a structure;
wherein the structure comprises a roof, a first side, and a second side;
wherein the first side and second side are located on opposing sides of the structure;
wherein the roof comprises a sloped rooftop, a ridge, and two or more eaves;
wherein the two or more eaves comprise a first eave and a second eave;
wherein the first eave is attached to the first side of the structure and the second eave is attached to the second side of the structure;
wherein each eave of the two or more eaves each comprises an overhang and a gutter;
a roof anchor assembly;
wherein the roof anchor assembly comprises two or more eave anchors, a ridge plate, and two or more safety lines;
wherein the two or more eave anchors comprises a first eave anchor and a second eave anchor;
wherein the first eave anchor is located at the first eave;
wherein the second eave anchor is located at the second eave;
wherein each eave anchor of the two or more eave anchors comprises a folded hairpin shape, a first end, a second end, a pair of stability hooks, and two prongs;
wherein the ridge plate comprises two pairs of open cross-section guides;
wherein each pair of open cross-section guides is affixed to the ridge plate;
wherein the ridge plate is located at the ridge;
wherein the two or more safety lines comprise a first safety line and a second safety line;
wherein each safety line of the two or more safety lines comprises an anchor end and a working end;
wherein the first safety line is attached to the first eave anchor; and
wherein the second safety line is attached to the second eave anchor.

2. The roof access system of claim 1, wherein each pair of the two pairs of open cross-section guides are each configured to provide a respective central opening.

3. The roof access system of claim 2, wherein the first safety line is configured to extend through the central opening provided by one of the two pairs of open cross-section guides and the second safety line is configured to extend through the central opening provided by the other pair of the two pairs of open cross-section guides.

4. The roof access system of claim 1, wherein the ridge plate comprises a top plate and a bottom plate.

5. The roof access system of claim 4, wherein the top plate and bottom plate are affixed to one another.

6. The roof access system of claim 5, wherein the top plate is constructed of a rigid material and the bottom plate is constructed of a compressible material.

7. The roof access system of claim 1, wherein each eave anchor further comprises two bearing caps; and wherein each bearing cap of the two bearing caps is attached to a distal end of a distinct prong of the two prongs.

8. The roof access system of claim 1, wherein each eave anchor further comprises a bearing pad; and wherein the bearing pad is attached to the two prongs.

9. The roof access system of claim 1, wherein a supplemental stability accessory is detachably coupled to the pair of stability hooks.

10. A roof access system comprising:

a structure;

wherein the structure comprises a roof, a first side, and a second side;

wherein the first side and second side are located on opposing sides of the structure;

wherein the roof comprises a sloped rooftop, a ridge, and two or more eaves;

wherein the two or more eaves comprise a first eave and a second eave;

wherein the first eave is attached to the first side of the structure and the second eave is attached to the second side of the structure;

wherein each eave of the two or more eaves each comprises an overhang and a gutter;

a roof anchor assembly;

wherein the roof anchor assembly comprises two or more eave anchors, a ridge plate, and two or more safety lines;

wherein the two or more eave anchors comprises a first eave anchor and a second eave anchor;

wherein the first eave anchor is located at the first eave;

wherein the second eave anchor is located at the second eave;

wherein each eave anchor of the two or more eave anchors comprises a folded hairpin shape, a first end, a second end, a pair of stability hooks, and two prongs;

wherein the first eave anchor is located at the eave on the first side;

wherein the second eave anchor is located at the eave on the second side;

wherein the ridge plate comprises two pairs of open cross-section guides, a top plate, and a bottom plate;

wherein each pair of open cross-section guides is affixed to the ridge plate;

wherein each pair of open cross-section guides are configured such that each pair provides a respective central opening;

wherein the ridge plate is located at the ridge;

wherein the two or more safety lines comprise a first safety line and a second safety line;

wherein each safety line of the two or more safety lines comprises an anchor end and a working end;

wherein the first safety line is attached to the first eave anchor; and wherein the second safety line is attached to the second eave anchor.

11. The roof access system of claim 10, wherein the first safety line is configured to extend through the central opening provided by one of the two pairs of open cross-section guides and the second safety line is configured to extend through the central opening provided by the other pair of the two pairs of open cross-section guides.

12. The roof access system of claim 10, wherein the top plate and bottom plate are affixed to one another.

13. The roof access system of claim 12, wherein the top plate is constructed of a rigid material and the bottom plate is constructed of a compressible material.

14. The roof access system of claim 10, wherein each eave anchor further comprises two bearing caps; and wherein each bearing cap is attached to a distal end of a distinct prong of the two prongs.

15. The roof access system of claim 10, wherein each eave anchor further comprises a bearing pad; and wherein the bearing pad is pivotally attached to the two prongs.

16. The roof access system of claim 10, wherein a supplemental stability accessory is detachably coupled to the pair of stability hooks.

17. A method of use for a roof anchor assembly, wherein the method comprises:

attaching a first safety line to a first eave anchor;

accessing a first eave of a roof located on a first side of a structure;

hanging the first eave anchor from a gutter spanning along the first eave;

configuring a working end of the first safety line to be proximate to a second side of the structure such that the first safety line crosses over a portion of a ridge of the roof;

attaching a second safety line to a second eave anchor;

accessing a second eave of the roof located on the second side of the structure;

hanging the second eave anchor from a gutter spanning along the second eave;

configuring a ridge plate over a portion of the ridge;

configuring the first safety line through a central opening of one of two pairs of open cross-section guides of the ridge plate; and configuring the second safety line through a central opening of the other pair of the two pairs of open cross-section guides.

18. The method of using the roof anchor assembly as described in claim 17, wherein the method further comprises accessing the ridge plate after hanging the second eave anchor from the gutter spanning along the eave on the second side.

19. The method of using the roof anchor assembly as described in claim 17, wherein the method further comprises maintaining possession of the first safety line while traversing a sloped rooftop located on the opposing side of the ridge relative to the side of the structure that the first eave anchor is located.

20. The method of using the roof anchor assembly as described in claim 17, wherein the method further comprises maintaining possession of the second safety line while traversing a sloped rooftop located on the opposing side of the ridge relative to the side of the structure that the second eave anchor is located.

* * * * *